United States Patent [19]

Lorenz

[11] 3,764,582

[45] Oct. 9, 1973

[54] PROCESS FOR PRODUCING EPOXIDE POLYADDUCTS IN PRESENCE OF PHOSPHORIC ACID TRIAMIDE ACCELERATORS

[75] Inventor: Joachim Lorenz, Bensheim-Auerbach, Germany

[73] Assignee: Ciba-Geigy Marienberg GmbH, Lautern/Odenwald, Germany

[22] Filed: Feb. 1, 1972

[21] Appl. No.: 222,696

[30] Foreign Application Priority Data
Feb. 3, 1971 Germany.................. P 21 04 912.7

[52] U.S. Cl. .......... 260/47 EC, 260/2 EC, 260/2 N, 260/47 EN, 260/78.4 EP, 260/830 TW, 260/830 R

[51] Int. Cl............................................ C08g 30/14

[58] Field of Search..................... 260/2 XA, 47 EC, 260/2 EC, 2 BP, 18 EP, 830 TW, 615 B, 613 B, 78.4 EP

[56] References Cited

UNITED STATES PATENTS

| | | | |
|---|---|---|---|
| 3,312,636 | 4/1967 | Rizzo | 260/2 |
| 3,450,647 | 6/1969 | Gunther | 260/47 X |

*Primary Examiner*—Harold D. Anderson
*Assistant Examiner*—T. Pertilla
*Attorney*—E. F. Wenderoth et al.

[57] ABSTRACT

Process for the production of epoxide polyadducts by the reaction of epoxide compounds with compounds giving polyadducts of epoxide compounds, whereby the reaction is carried out in the presence of a phosphoric acid triamide as a reaction accelerator in an amount of 0.05 to 10 parts by weight to 100 parts by weight of the epoxide compound.

2 Claims, No Drawings

PROCESS FOR PRODUCING EPOXIDE POLYADDUCTS IN PRESENCE OF PHOSPHORIC ACID TRIAMIDE ACCELERATORS

The invention relates to the production of polyadducts having a base of epoxide resins of the usual composition, such as are used for the production of shaped components, for the formation of coatings, as adhesives and as binders. Such epoxide resin systems usually contain, in addition to epoxide resin — or mixtures of various epoxide resins — (by epoxide resin is meant, as is known, compounds having at least one epoxide group — cp. H. LEE and KR. NEVILLE "Handbook of Epoxy Resins," McGRAW-HILL Book Co. 1967, pages 1 – 2), curing agents — or mixtures of several curing agents — and, optionally, further additives, e.g., fillers, extenders, etc.. The curing agents employed for cold curing at normal temperature are usually amines of various structures, polyaminoamides, melamine resins; or for hot curing: anhydrides of organic or inorganic acids, as well as phenol resins or isocyanates. The curing process is based on the reaction between the curing agent and the epoxide groups of the resin. The time required for curing depends particularly on the type of curing agent employed and on the curing conditions.

If the epoxide resin/curing agent mixture contains, as a further constituent, additives such as, e.g., certain types of tar, mineral substances, pigment dyestuffs, extenders, e.g., having a mineral-oil base, or if it is used for the production of coating substances with application of glass, mica, asbestos, or for the coating of paper, metals, etc., there occurs a retarding of the curing process compared with that in the case of the unfilled resin/curing agent system.

A number of additives have already been suggested which accelerate the curing both of the above mentioned filled and of the unfilled resin/curing agent systems, or which result in a lowering of the temperature required for curing. In the case of the reaction of acid anhydrides with epoxide resins containing no hydroxyl groups, especially with types such as bisphenol-A-diglycidyl ether, a curing to obtain usable products is, as a rule, only to any extent possible after certain curing accelerators have been added.

Of the products suggested for the acceleration of the reaction of anhydrides, summarised by LEE and NEVILLE in the quoted reference, pages 12 – 13, practical use has been made, in particular, of tertiary amines such as, e.g., tris-(dimethylaminomethyl)-phenol.

Already suggested phosphorus compounds having an accelerating effect are triphenylphosphite (British Patent Specification No. 880302) and phosphines such as triphenylphosphine and tris-2-ethylhexylphosphine (U.S. Patent Specification No. 2,768,153), and diphosphites (German Application P 18 17 110.3/44). All these accelerators have certain disadvantages. Tertiary amines frequently have such a high vapour pressure that they cannot be employed for curing in vacuo. Furthermore, a general disadvantage characteristic of the amines is that they become discoloured during storage and this results in discolouration of the cured component. The suggested phosphines have, with regard to curing with amine curing agents, no accelerating action. Triphenylphosphite can be considered as a base of which the action should, therefore, be similar to that of the tertiary amines. It is, however, shown that triphenylphosphite is not able to accelerate the reaction of bisphenol-A-diglycidyl ether with acid anhydrides such as phthalic acid anhydride or hexahydrophthalic acid anhydride. This product displays an accelerating action only with respect to amine curing agents; it has to be employed, however, in amounts which have a modifying effect on a number of properties of the polyadduct.

The last-mentioned aspect also applies in the case of diphosphites, since they are used in amounts of 5 – 20 parts by weight to 100 parts by weight of epoxide resin.

The object of the present invention was therefore to provide an accelerator which can be applied in such small amounts that the properties of the cured shaped-component are not affected, which is itself colourless and which, even during storage, does not become discoloured, and does not lead to discolourations during the curing process, which has a vapour pressure enabling it to be used also under the conditions associated with vacuum techniques, and which is able to accelerate both amine-cured and acid-anhydride-cured systems.

It has now been found that phosphoric acid triamides of the general formula $(R_1R_2N)_3PO$ can be used as accelerators for the curing of epoxide resin systems. With regard to these products, they are not bases, but neutral chemical products, and the accelerating action was thus not to be expected. The compounds described by the formula are colourless, liquid or solid compounds which are readily soluble in epoxide resins, which do not lead to discolourations during curing and which, in addition, have e.g., in epoxide resin/acid anhydride systems, a solubility-promoting effect with respect to the solubility of the still uncured acid anhydride.

The invention thus relates to a process for the production in shaped form of epoxide polyadducts, the said process comprising the reaction of epoxide compounds containing at least one epoxy group in the molecule with compounds giving polyadducts of epoxide compounds, in the presence of a reaction accelerator consisting of phosphoric acid triamides of the general formula $(R_1R_2N)_3PO$ in an amount of 0.05 to 10.0 parts by weight to 100 parts by weight of epoxide compounds.

In this formula, $R_1$ and $R_2$ can be identical or different alkyl groups having 1 – 4 carbon atoms. In particular, $R_1$ and $R_2$ are identical and represent methyl; $R_1$ and/or $R_2$ can, however, also be ethyl, propyl or butyl.

The phosphoric acid triamides are as a rule known. Their formation wsa firstly described by MICHAELIS (Liebigs Ann. Chem. 326, 129, 1903.

The addition of the curing accelerators according to the present invention is made to the epoxide or to the curing agent, or to the mixture of the epoxide resin with the curing agent. The invention is further illustrated by the folowing examples; it is not, however, limited to these examples.

EXAMPLE 1)

The curing time of a system being cured at 120°C and consisting of 50 g of epoxide resin (cycloaliphatic diepoxide resin, epoxide-equivalent-weight 157) and 40 g of phthalic acid anhydride is, without the addition of a curing accelerator (control test), 1 hour. After the following additions have been made, the curing times are as stated below:

0.02 g of hexamethylphosphoric acid triamide: 25 minutes 0.25 g of hexamethylphosphoric acid triamide: 15 minutes 1.00 g of hexamethylphosphoric acid triamide: 10 minutes.

EXAMPLE 2)

The curing time of a system curing at 150° C and consisting of 50 g of epoxide resin (unmodified liquid standard resin having a base of bisphenol-A with an epoxide-equivalent weight of about 190) and 39 g of phthalic acid anhydride is, without the addition of a curing accelerator (control test), 180 minutes. After the following additions have been made, the curing times are as stated below:

0.5 g of hexamethylphosphoric acid triamide: 60 minutes, 2.5 g of hexamethylphosphoric acid triamide: 7 minutes.

EXAMPLE 3)

The curing time of a system curing at 150° C and consisting of 50 g of epoxide resin (unmodified liquid standard resin having a base of bisphenol-A with an epoxide-equivalent weight of about 190) and 40.5 g of hexahydrophthalic acid anhydride is, without the addition of a curing accelerator (control test), 6.5 hours. After the following additions have been made, the curing times at 120° C are as stated below:

1 g of hexamethylphosphoric acid triamide: 68 minutes, 1 g of hexaethylphosphoric acid triamide : 70 minutes, 1 g of tris-(methyl-butylamino)phosphine oxide: 80 minutes.

Example 4)

The curing time of a system curing at room temperature and consisting of 100 g of epoxide resin (unmodified liquid standard resin having a base of bisphenol-A with an epoxide-equivalent weight of about 190) and 27.8 g of a cycloaliphatic polyamine, H-active equivalent weight 52, as curing agent is, without the addition of a curing accelerator (control test), 91 minutes. After the following addition has been made, the curing time is as follows:

5 g of hexamethylphosphoric acid triamide: 85 minutes.

I claim:

1. In a process for producing epoxide polyadducts in shaped form comprising reacting epoxide resins with compounds capable of producing polyadducts of epoxide resins and selected from the group consisting of amines and organic acid anhydrides in the presence of a reaction accelerator, the improvement wherein the reaction accelerator consists of phosphoric acid triamides of the formula:

$(R_1R_2N)_3$ PO wherein $R_1$ and $R_2$ are identical or different and represent in each case an alkyl group having 1 to 4 carbon atoms in an amount of 0.05 – 10.0 parts by weight to 100 parts by weight of the epoxide resin.

2. A process according to claim 1 wherein hexamethylphosphoric acid triamide is the reaction accelerator.

* * * * *